US012689110B2

(12) United States Patent
Rhoads et al.

(10) Patent No.: US 12,689,110 B2
(45) Date of Patent: Jul. 21, 2026

(54) FREQUENCY SHIFTING EXCITERS FOR LOOP GAP RESONATORS

(71) Applicant: Honeywell International Inc., Charlotte, NC (US)

(72) Inventors: Charles Rhoads, North Hollywood, CA (US); Chad Fertig, Roseville, MN (US); Luke Horstman, Saint Louis Park, MN (US)

(73) Assignee: Honeywell International Inc., Charlotte, NC (US)

( * ) Notice: Subject to any disclaimer, the term of this patent is extended or adjusted under 35 U.S.C. 154(b) by 162 days.

(21) Appl. No.: 18/821,548

(22) Filed: Aug. 30, 2024

(65) Prior Publication Data

US 2026/0081338 A1 Mar. 19, 2026

(51) Int. Cl.
*H01P 7/00* (2006.01)

(52) U.S. Cl.
CPC .................................... *H01P 7/00* (2013.01)

(58) Field of Classification Search
CPC .................................................... H01P 7/00
See application file for complete search history.

(56) References Cited

U.S. PATENT DOCUMENTS 4,570,137 A * 2/1986 DiSilvestro ............... H01P 7/00 333/229
4,623,835 A 11/1986 Mehdizadeh et al.
4,758,789 A * 7/1988 Ono ..................... G01R 33/345 324/318
4,812,791 A * 3/1989 Makimoto ............. H01P 7/082 333/204
4,866,387 A * 9/1989 Hyde .................. G01R 33/365 324/318

(Continued)

FOREIGN PATENT DOCUMENTS

EP 2629158 A1 8/2013
JP H07333310 A 12/1995
JP 3310519 B2 8/2002

OTHER PUBLICATIONS

Eisenach et al., "Broadband loop gap resonator for nitrogen vacancy centers in diamond", Review of Scientific Instruments, vol. 89, No. 9, Sep. 24, 2018, pp. 094705-1 through 094705-10.

(Continued)

*Primary Examiner* — Samuel S Outten
(74) *Attorney, Agent, or Firm* — Fogg & Powers LLC

(57) ABSTRACT

A device comprises a loop gap resonator having opposing sides and a central opening therethrough; and at least one exciter board positioned over, and at a preselected distance from, at least one of the opposing sides of the loop gap resonator. The exciter board includes at least one metallized layer and a central hole therethrough. The exciter board has one or more cutouts with respect to the central hole that define a geometric configuration, such that a first portion of the metallized layer borders with the central hole at a first distance from a center point of the central hole. A second portion of the metallized layer borders the one or more cutouts at a second distance from the center point that is greater than the first distance. The exciter board is configured to shift a resonant frequency of the loop gap resonator to match a predetermined resonant frequency.

20 Claims, 7 Drawing Sheets

(56) References Cited

U.S. PATENT DOCUMENTS

| | | | | |
|---|---|---|---|---|
| 5,616,540 | A * | 4/1997 | Lithgow | H01P 1/208<br>505/700 |
| 5,629,266 | A * | 5/1997 | Lithgow | H01P 7/084<br>505/700 |
| 9,083,363 | B2 | 7/2015 | Fertig et al. | |
| 9,989,926 | B2 | 6/2018 | Fertig et al. | |
| 10,218,368 | B2 | 2/2019 | Fertig et al. | |
| 10,535,981 | B1 | 1/2020 | Boyd et al. | |
| 2017/0244418 | A1* | 8/2017 | Fertig | H03L 5/02 |

OTHER PUBLICATIONS

European Patent Office, "Extended European Search Report", dated Nov. 28, 2025, from EP Application No. 25182290.4, from Foreign Counterpart to U.S. Appl. No. 18/821,548, pp. 1 through 8, Published: EP.

Mehdizadeh et al., "Lumped Mode Microwave Resonant Structures", IEEE—MTTS International Microwave Symposium. Digest, XP 001366773, May 31, 1983, pp. 95 through 97.

Skrivervik, et al., "Microwave cavities for dual resonance atomic clocks", 2023 24th International Conference on Applied Electromagnetics and Communications (ICECOM), IEEE, Sep. 27, 2023, pp. 1 through 4.

Ivanov et al., "Design of atomic clock cavity based on a loop-gap geometry and modified boundary conditions", International Journal of Microwave and Wireless Technologies, Jun. 27, 2017, Vo. 9, No. 7, pp. 1373 through 1386.

Rhoads et al., "Apparatus and Method for Coupling Electromagnetic Energy Into a Cavity of a Resonator Which Includes One or More Loop-Gap Resonators", U.S. Appl. No. 18/431,068, filed Feb. 2, 2024, pp. 1 through 32, Published: US.

* cited by examiner

FREQUENCY SHIFTING EXCITERS FOR LOOP GAP RESONATORS

STATEMENT REGARDING FEDERALLY SPONSORED RESEARCH OR DEVELOPMENT

This invention was made with Government support under N00014-22-C-1043 awarded by Navy. The Government has certain rights in the invention.

BACKGROUND

Loop gap resonators (LGRs) are precision resonant microwave components used in sensors such as laser cooled atomic clocks. An LGR is often used inside the ultra high vacuum system of an atomic clock to provide a homogeneous interaction for the atoms, resulting in high accuracy for the atomic clock. The resonant frequency of an LGR needs to match the resonant frequency of the atomic sample being probed, and is determined primarily by its machined geometry, which is inaccessible once the LGR is installed in ultra high vacuum.

While changes in the geometry of the LGR allow for changes in the resonant frequency, mechanical geometry changes can be difficult to perform for components sealed inside an ultra high vacuum environment. Some prior approaches have relied exclusively upon the machined features of the LGR to determine the resonant frequency, with no ability to modify the resonant frequency in a controlled fashion once the LGR is installed inside a ultra high vacuum cell. Other approaches have utilized conductors placed over capacitive gaps in the LGR, but this severely disrupts the efficiency of energy transfer to an LGR with gaps already tuned for efficient energy transfer.

SUMMARY

A device comprises a loop gap resonator having opposing sides and a central opening therethrough; and at least one exciter board positioned over, and at a preselected distance from, at least one of the opposing sides of the loop gap resonator. The at least one exciter board includes at least one metallized layer and a central hole therethrough. The at least one exciter board has one or more cutouts with respect to the central hole that define a geometric configuration, such that a first portion of the at least one metallized layer borders with the central hole at a first distance from a center point of the central hole. A second portion of the at least one metallized layer borders the one or more cutouts at a second distance from the center point that is greater than the first distance. The at least one exciter board is configured to shift a resonant frequency of the loop gap resonator to match a predetermined resonant frequency.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various embodiments of a frequency shifting exciter for loop gap resonators, and methods for tuning a resonant frequency of loop gap resonators, are described herein.

The frequency shifting exciters described herein have the ability to finely trim a resonant frequency of loop gap resonators (LGRs) using components external to a ultra high vacuum (UHV) cell, while maintaining good coupling between exciter board coupling loops and LGR feed loops. This enables potential relaxed manufacturing specifications in the machining of LGRs, as well as introducing the ability to fine tune the resonant frequency during manufacture, thus enhancing the performance of atomic sensors such as atomic clocks. In addition, the present methods provide for in-situ tuning of the LGR frequency, which does not require the manipulation of in vacuum mechanical structures such as tuning screws.

The frequency shifting exciters can be fabricated as exciter boards using standard printed circuit board (PCB) fabrication technology. The exciter boards are fabricated with various cutouts with respect to a central hole that define different geometric configurations, which have an effect on the LGR resonant frequency and Q factor to varying degrees. In various embodiments, the exciter board can be a multilayer circuit board made of one or more metallized (e.g., copper) layers, and one or more substrate material layers.

The geometry of the exciter boards can be modified by changing the dimensions of the cutouts. For example, the cutouts in the exciter boards can have various user definable dimensions, such as arc sectors with varying lengths, widths, and depths, such that the exciter boards that will tune the resonant frequencies of LGR structure.

The exciter boards are designed to modify the boundary conditions of the microwaves in the LGR structure, from outside of vacuum, so as to shift the resonant frequency of the LGR, which resides inside vacuum. By fine trimming of the circuit board structure, the frequency of the LGR can be trimmed externally without interfering with a UHV chamber of the atomic sensor.

In various embodiments, the exciter boards are configured to deliver microwave energy to the LGR and also tune the electromagnetic resonance of the LGR. For example, excitation signal transmission lines can be produced in a circuit board using strip lines to isolate the signals from electromagnetic fields coupled from nearby structures.

Further details of various embodiments are described hereafter and with reference to the drawings.

Figure 1:
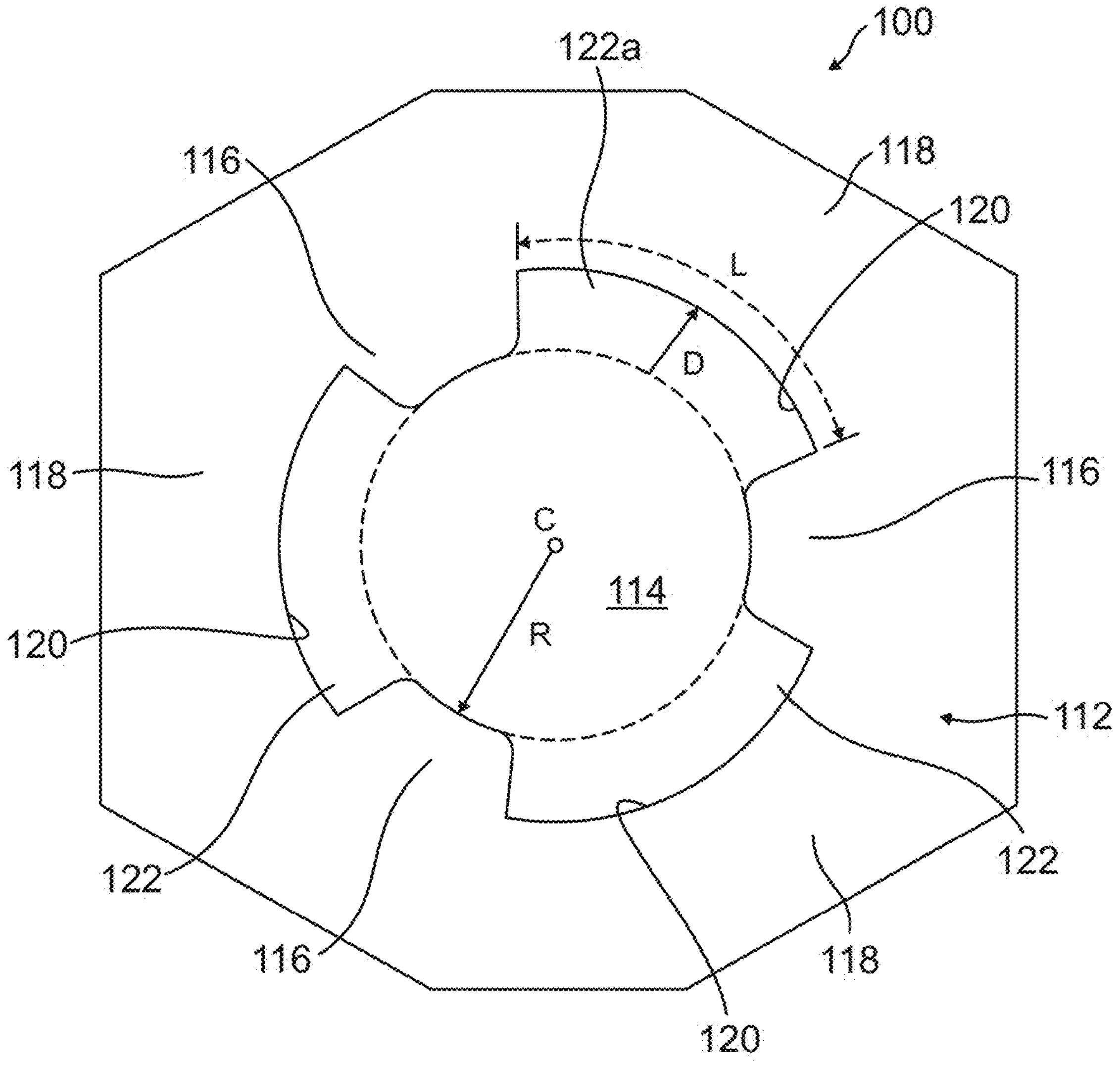
FIG. 1 is a top view of an exciter board for a loop gap resonator, according to one embodiment.

FIG. 1 is a top view of an exciter board 100 for a loop gap resonator, according to one embodiment. The exciter board 100 includes at least one metallized layer 112 and a central hole 114. In some embodiments, exciter board 100 includes at least two metalized layers, which are configured as signal and return layers. The metallized layers can include feed loops (not shown), which are connected to transmission lines within exciter board 100. The feed loops are each substantially aligned with respective feed holes in a loop gap resonator when the exciter board is positioned therewith, such that electromagnetic fields are coupled to the loop gap resonator.

The exciter board 100 has multiple cutouts 120 with respect to central hole 114, which define a geometric configuration. For example, cutouts 120 can form substantially arc-shaped sections 122 with respect to central hole 114. As shown in FIG. 1, central hole 114 has a radius R from a center point C. An arc-shaped section **122*a* has an arc length L, and a depth D with respect to a circumference of central hole 114. This configuration results in a set of first portions 116 of metallized layer 112 that border with central hole 114 at a first distance from center point C (e.g., radius R). A set of second portions 118 of metallized layer 112 border with cutouts 120** at a second distance from center point C (e.g., radius R+depth D) that is greater than the first distance.

The exciter board 100 is configured to shift a resonant frequency of a loop gap resonator to substantially match a predetermined resonant frequency, such as a resonant frequency of an atomic sample being probed in an atomic sensor.

Figure 2B:
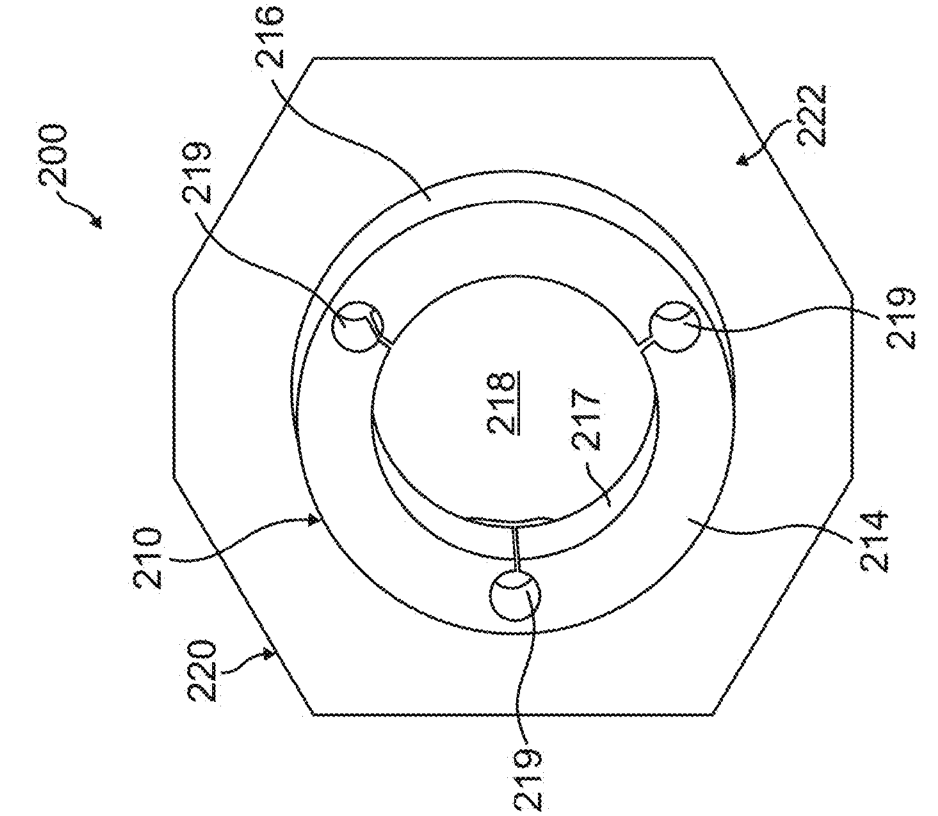
FIGS. 2A and 2B are isometric views of a frequency shifting device including an exciter board and loop gap resonator, according to an example embodiment.
Figure 2A:
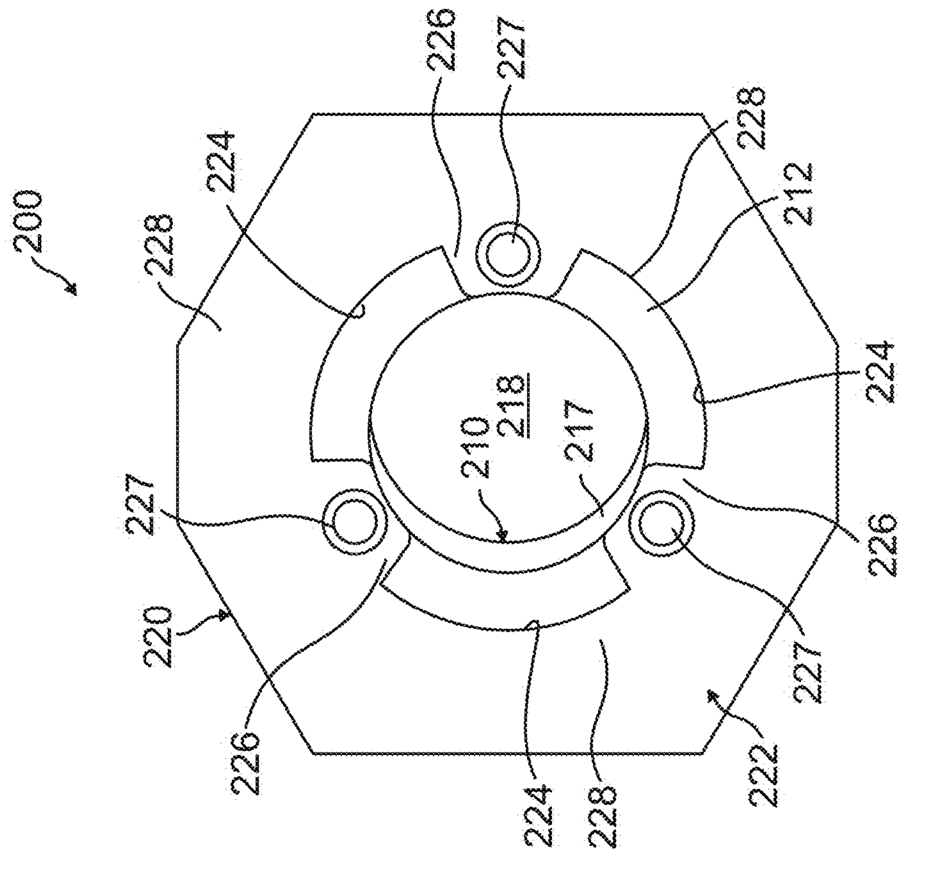

FIGS. 2A and 2B are isometric views of a device 200, according to an example embodiment. The device 200 comprises a loop gap resonator 210 having a first side 212 and an opposing second side 214. An outer sidewall 216 and an inner sidewall 217 extend between first and second sides 212, 214. The loop gap resonator 210 has a central opening 218 extending therethrough, and a set of feed holes 219 that extend between first and second sides 212, 214. The feed holes 219 are in communication with central opening 218 through inner sidewall 217. In one embodiment, loop gap resonator 210 has a substantially cylindrical shape.

An exciter board 220 is positioned adjacent to, and at a preselected distance from, first side 212 of loop gap resonator 210. The exciter board 220 includes at least one metallized layer 222 and a central hole therethrough that substantially aligns with central opening 218 loop gap resonator 210. The exciter board 220 has multiple cutouts 224 that define a geometric configuration. For example, cutouts 224 can form substantially arc-shaped sections with respect to the central hole of exciter board 220, as shown in FIG. 2A. This configuration results in a set of first portions 226 of metallized layer 222 that border with the central hole of exciter board 220 at a first distance from a center point of the central hole. A set of second portions 228 of metallized layer 222 border with cutouts 224 at a second distance from the center point that is greater than the first distance. The cutouts 224 can have a similar shape as arc-shaped sections 122 of FIG. 1.

As shown in FIG. 2A, the first portions 226 of metallized layer 222 each include respective feed loops 227, which are connected to transmission lines within exciter board 220. The feed loops 227 are each substantially aligned with respective feed holes 219 loop gap resonator 210 (FIG. 2B). The exciter board 220 is configured to shift a resonant frequency of loop gap resonator 210 to substantially match a predetermined resonant frequency, such as a resonant frequency of an atomic sample being probed in an atomic sensor.

Figure 3:
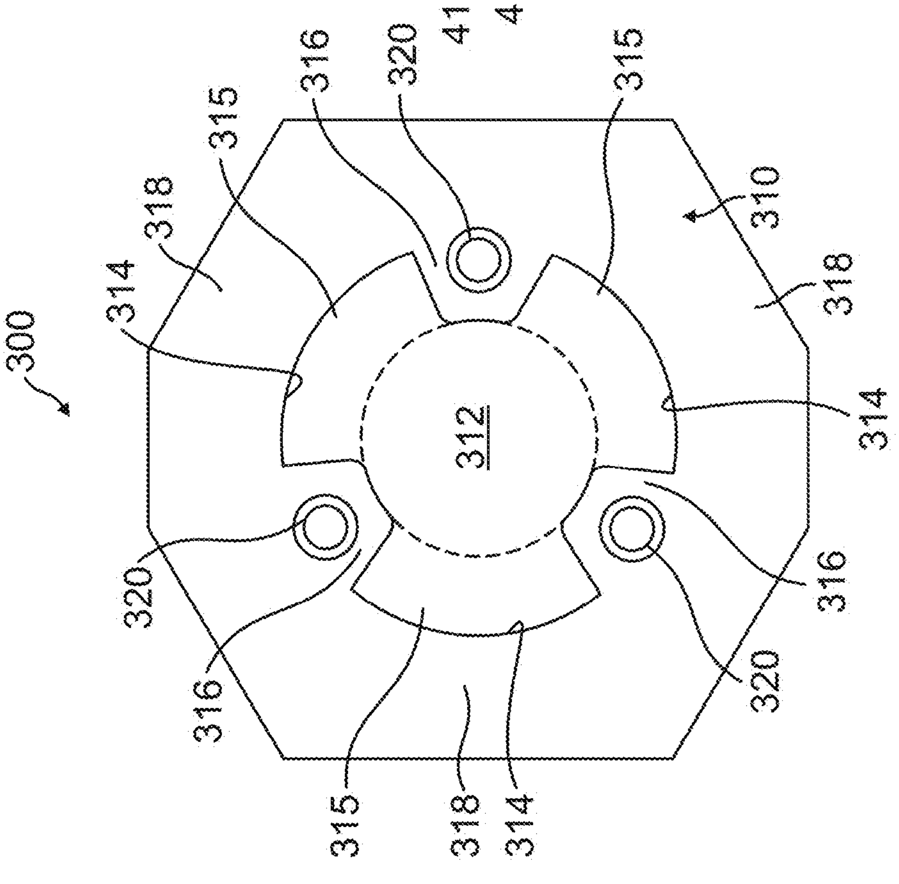
FIG. 3 is a top view of an exciter board for a loop gap resonator, according to another embodiment.

FIG. 3 is a top view of an exciter board 300 for a loop gap resonator, according to another embodiment. The exciter board 300 includes at least one metallized layer 310 and a central hole 312 therethrough. The exciter board 300 has multiple cutouts 314, with respect to central hole 312, which define another geometric configuration (different from exciter board 100, FIG. 1). A set of first portions 316 of exciter board 300 border with central hole 312 at a first distance from a center point of central hole 312. A set of second portions 318 of exciter board 300 border with cutouts 314 at a second distance from the center point of central hole 312 that is greater than the first distance. For example, cutouts 314 form substantially arc-shaped sections 315 with respect to central hole 312 that are sized differently than arc-shaped sections 122 of FIG. 1.

The first portions 316 of exciter board 300 each include a feed loop 320, which are connected to transmission lines within exciter board 300. Each feed loop 320 is located so that it substantially aligns with a respective feed hole in a loop gap resonator when exciter board 300 is positioned therewith, such that electromagnetic fields are coupled to the loop gap resonator.

The exciter board 300 is configured to shift a resonant frequency of a loop gap resonator to substantially match a predetermined resonant frequency, such as a resonant frequency of an atomic sample being probed in an atomic sensor.

Figure 4:
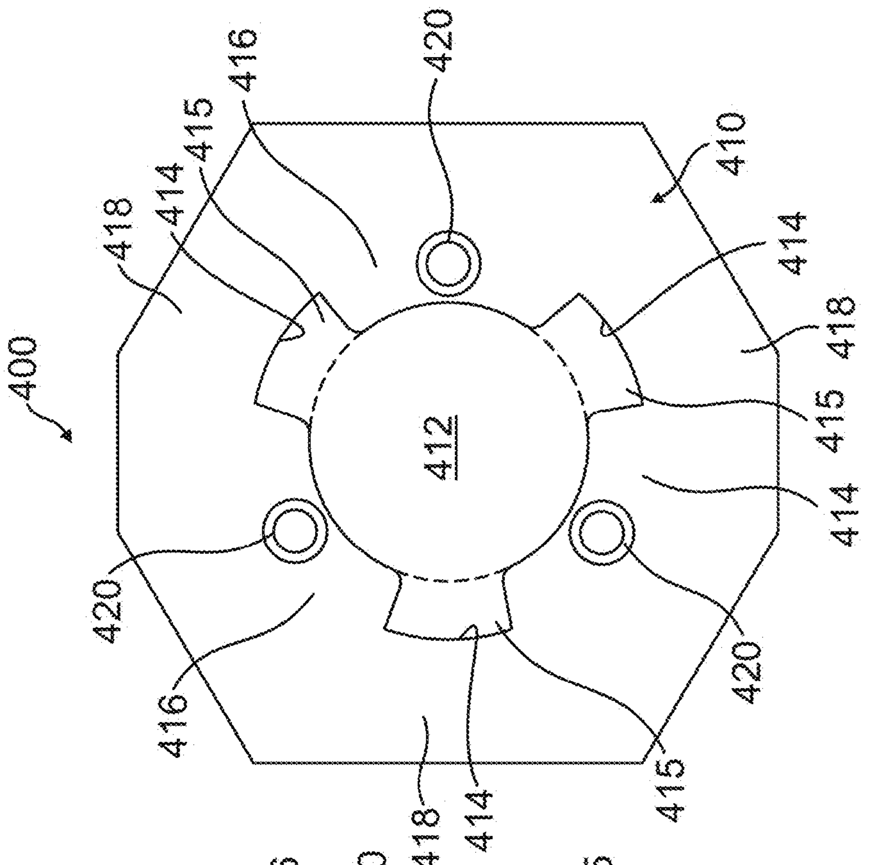
FIG. 4 is a top view of an exciter board for a loop gap resonator, according to a further embodiment.

FIG. 4 is a top view of an exciter board 400 for a loop gap resonator, according to a further embodiment. The exciter board 400 includes at least one metallized layer 410 and a central hole 412 therethrough. The exciter board 400 has multiple cutouts 414, with respect to central hole 412, which define a further geometric configuration (e.g., different from exciter board 300, FIG. 3). A set of first portions 416 of exciter board 400 border with central hole 412 at a first distance from a center point of central hole 412. A set of second portions 418 of exciter board 400 border with cutouts 414 at a second distance from the center point of central hole 412 that is greater than the first distance. For example, cutouts 414 form smaller arc-shaped sections 415 with respect to central hole 412 (compared to arc-shaped sections 315, FIG. 3).

The first portions 416 of exciter board 400 each include a feed loop 420, which are connected to transmission lines within exciter board 400. Each feed loop 420 is located so that it substantially aligns with a respective feed hole in a loop gap resonator when exciter board 400 is positioned therewith, such that electromagnetic fields are coupled to the loop gap resonator.

The exciter board 400 is configured to shift a resonant frequency of a loop gap resonator to substantially match a predetermined resonant frequency, such as a resonant frequency of an atomic sample being probed in an atomic sensor.

Figure 5A:
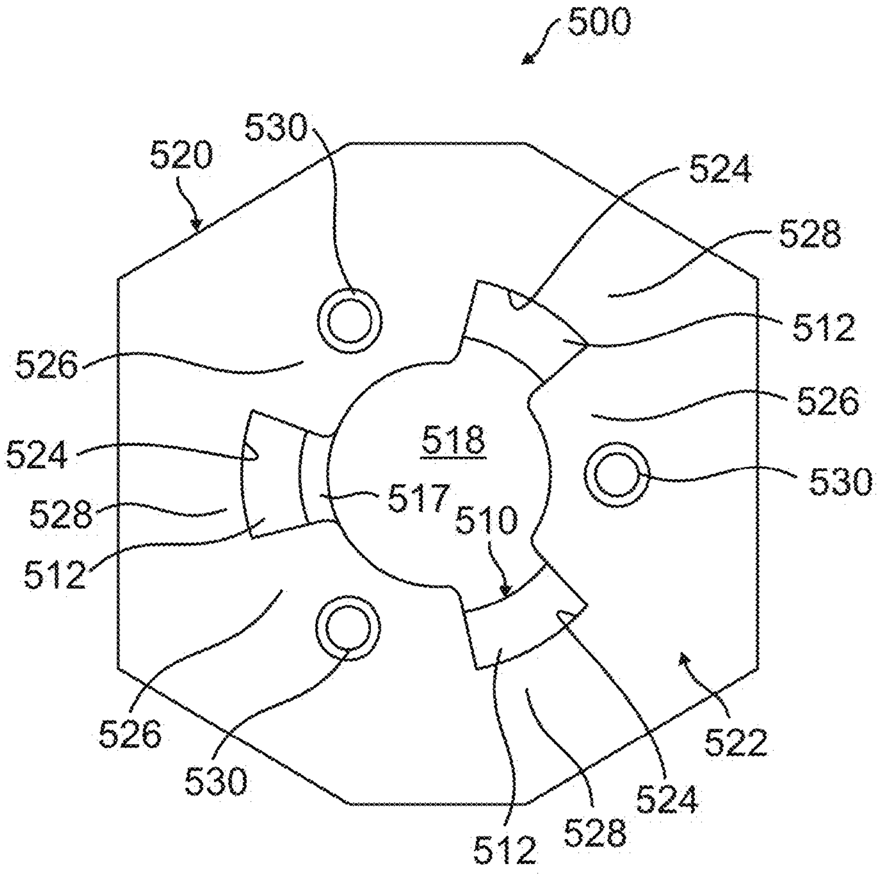
FIG. 5A is a top view of a frequency shifting device, including an exciter board and loop gap resonator, according to another embodiment.
Figure 5B:
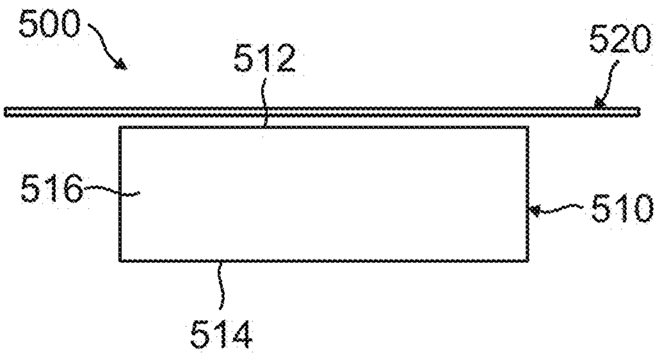
FIG. 5B is a side view of the frequency shifting device of FIG. 5A.

FIGS. 5A and 5B illustrate a frequency shifting device 500, according to another example embodiment. The device 500 comprises a loop gap resonator 510 having a first side 512 and an opposing second side 514. An outer sidewall 516 and an inner sidewall 517 extend between first and second sides 512 and 514. The loop gap resonator 510 has a central opening 518 extending therethrough. In one embodiment, loop gap resonator 510 has a substantially cylindrical shape.

An exciter board 520 is positioned adjacent to, and at a preselected distance from, first side 512 of loop gap resonator 510, such as shown in FIG. 5B. The exciter board 520 includes at least one metallized layer 522, and a central hole therethrough that substantially aligns with central opening 518 in loop gap resonator 510. The exciter board 520 has multiple cutouts 524 that define a geometric configuration, which results in a set of first portions 526 of metallized layer 522 that border with the central hole of exciter board 520 at a first distance from a center point of the central hole. A set of second portions 528 of metallized layer 522 border with cutouts 524 at a second distance from the center point that is greater than the first distance. For example, cutouts 524 form smaller arc-shaped sections with respect to the central hole (similar to arc-shaped sections 415, FIG. 4, but differently sized).

The first portions 526 of exciter board 520 each include respective feed loops 530, which are connected to transmission lines within exciter board 520. The feed loops 530 are each substantially aligned with respective feed holes (not shown) of loop gap resonator 510. The exciter board 520 is configured to shift a resonant frequency of loop gap resonator 510 to substantially match a predetermined resonant frequency, such as a resonant frequency of an atomic sample being probed in an atomic sensor.

Figure 6A:
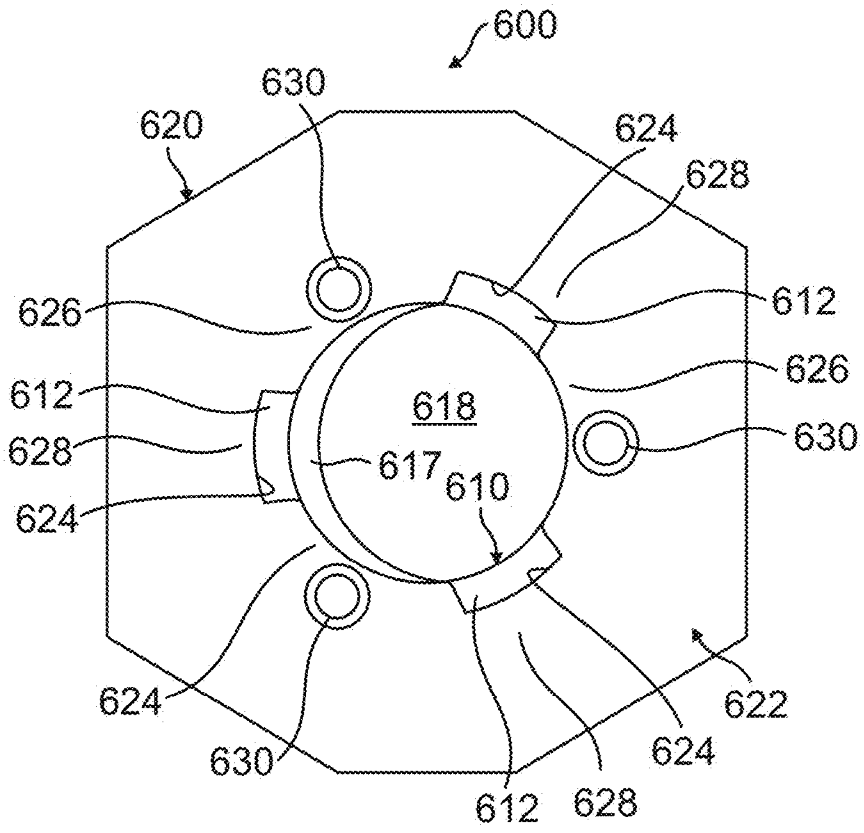
FIG. 6A is a top view of a frequency shifting device, including an exciter board and loop gap resonator, according to a further embodiment.
Figure 6B:
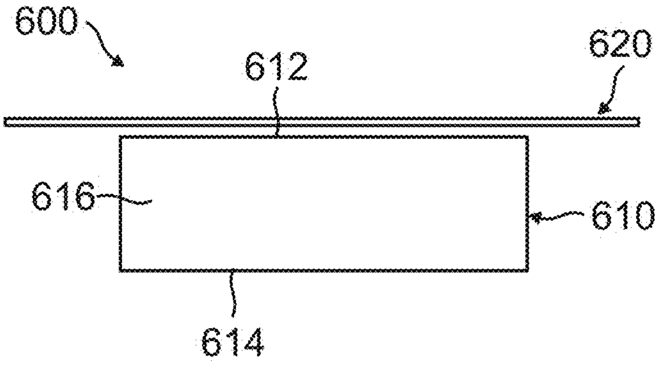
FIG. 6B is a side view of the frequency shifting device of FIG. 6A.

FIGS. 6A and 6B illustrate a frequency shifting device 600, according to a further example embodiment. The device 600 comprises a loop gap resonator 610 having a first side 612 and an opposing second side 614. An outer sidewall 616 and an inner sidewall 617 extend between first and second sides 612 and 614. The loop gap resonator 610 has a central opening 618 extending therethrough. In one embodiment, loop gap resonator 610 has a substantially cylindrical shape.

An exciter board 620 is positioned adjacent to, and at a preselected distance from, first side 612 of loop gap resonator 610, such as shown in FIG. 6B. The exciter board 620 includes at least one metallized layer 622, and a central hole therethrough that substantially aligns with central opening 618 in loop gap resonator 610. The exciter board 620 has multiple cutouts 624 that define a geometric configuration, such that a set of first portions 626 of exciter board 620 border with the central hole of exciter board 620 at a first distance from a center point of the central hole. A set of second portions 628 of exciter board 620 border with cutouts 624 at a second distance from the center point that is greater than the first distance. For example, cutouts 624 form arc-shaped sections with respect to the central hole (similar to arc-shaped sections 415, FIG. 4, but having a smaller size).

The first portions 626 of exciter board 620 each include respective feed loops 630, which are coupled to transmission lines within exciter board 620. The feed loops 630 are each substantially aligned with respective feed holes (not shown) of loop gap resonator 610. The exciter board 620 is configured to shift a resonant frequency of loop gap resonator 610 to match a predetermined resonant frequency, such as a resonant frequency of an atomic sample being probed in an atomic sensor.

Figure 7A:
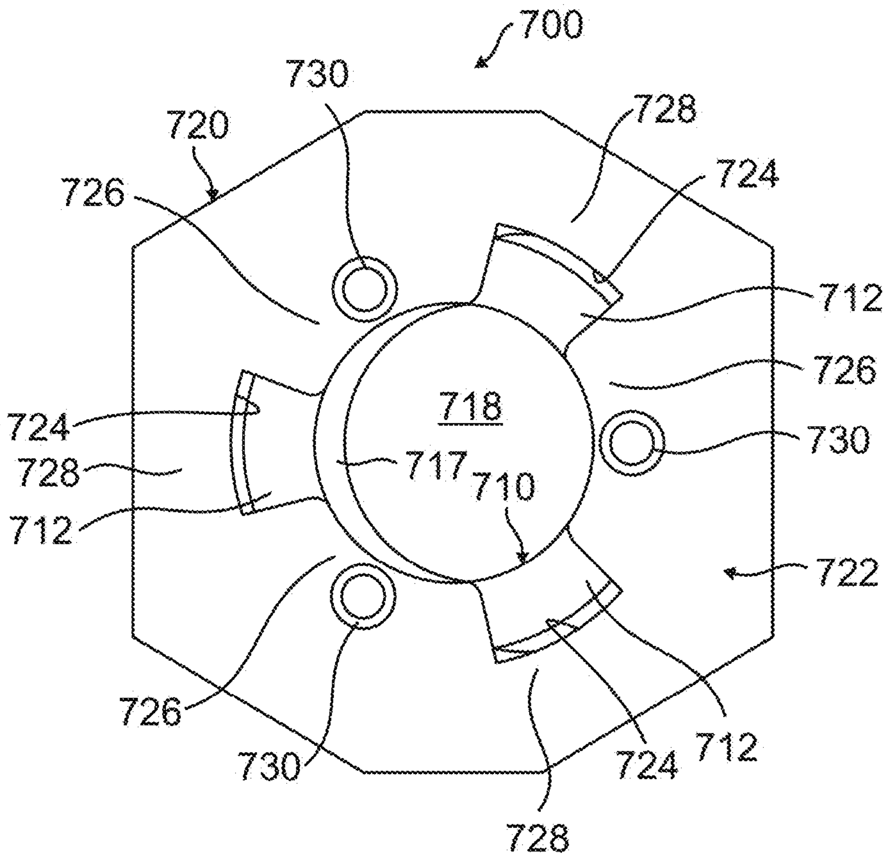
FIG. 7A is a top view of a frequency shifting device, including an exciter board and loop gap resonator, according to another embodiment.
Figure 7B:
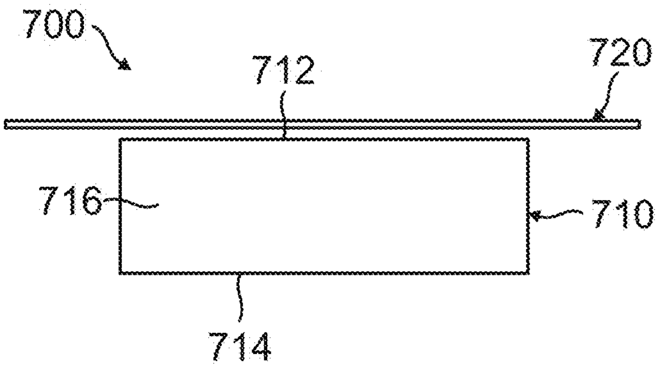
FIG. 7B is a side view of the frequency shifting device of FIG. 7A.

FIGS. 7A and 7B illustrate a frequency shifting device 700, according to a another example embodiment. The device 700 comprises a loop gap resonator 710 having a first side 712 and an opposing second side 714. An outer sidewall 716 and an inner sidewall 717 extend between first and second sides 712 and 714. The loop gap resonator 710 has a central opening 718 extending therethrough. In one embodiment, loop gap resonator 710 has a substantially cylindrical shape.

An exciter board 720 is positioned adjacent to, and at a preselected distance from, first side 712 of loop gap resonator 710, such as shown in FIG. 7B. The exciter board 720 includes at least one metallized layer 722, and a central hole therethrough that substantially aligns with central opening 718 in loop gap resonator 710. The exciter board 720 has multiple cutouts 724 that define a geometric configuration, such that a set of first portions 726 of exciter board 720 border with the central hole of exciter board 720 at a first distance from a center point of the central hole. A set of second portions 728 of exciter board 720 border with cutouts 724 at a second distance from the center point that is greater than the first distance. For example, cutouts 724 form arc-shaped sections with respect to the central hole (similar to arc-shaped sections 415, FIG. 4, but having a larger size).

The first portions 726 of exciter board 720 each include respective feed loops 730, which are connected to transmission lines within exciter board 720. The feed loops 730 are each substantially aligned with respective feed holes (not shown) of loop gap resonator 710. The exciter board 720 is configured to shift a resonant frequency of loop gap resonator 710 to match a predetermined resonant frequency, such as a resonant frequency of an atomic sample being probed in an atomic sensor.

Figure 8:
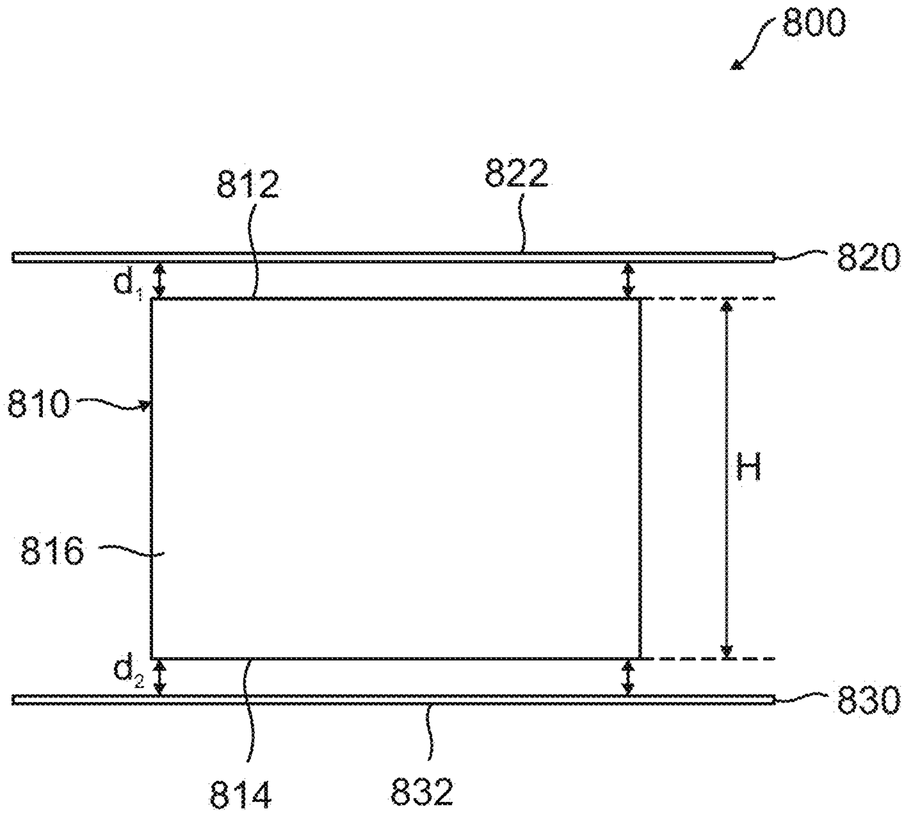
FIG. 8 is a side view of a frequency shifting device, according to an alternative embodiment.

FIG. 8 is a schematic side view of a frequency shifting device 800, according to an alternative embodiment. The device 800 comprises a loop gap resonator 810 having a first side 812 and an opposing second side 814. An outer sidewall 816 extends between first and second sides 812 and 814. The loop gap resonator 810 has a central opening extending therethrough defined by an inner sidewall (not shown). In one embodiment, loop gap resonator 810 has a substantially cylindrical shape, with a height H.

At least one first exciter board 820 is positioned over first side 812 of loop gap resonator 810, and is located at a preselected distance $d_1$ from first side 812. The exciter board 820 includes at least one metallized layer 822 and a central hole therethrough that substantially aligns with the central opening of loop gap resonator 810. In addition, at least one second exciter board 830 is positioned over second side 814 of loop gap resonator 810, and is located at a preselected distance $d_2$ from second side 814. The exciter board 830 includes at least one metallized layer 832 and a central hole therethrough that substantially aligns with the central opening of loop gap resonator 810.

The exciter boards 820 and 830 each include one or more cutouts with respect to the central holes therein that define a selected geometric configuration, resulting in a first portion of metallized layers 822 and 832 that border with the central holes at a first distance from the center point of the central holes. A second portion of metallized layers 822 and 832 border with the cutouts at a second distance from the center point that is greater than the first distance. For example, the cutouts in exciter boards 820 and 830 can have various geometric configurations, such as the different arc-shaped sections described in the foregoing embodiments.

The exciter boards 820 and 830 can each include feed loops, which are connected to transmission lines within exciter boards 820 and 830. Each feed loop is located so that it substantially aligns with a respective feed hole in loop gap resonator 810. The exciter boards 820 and 830 are configured to shift a resonant frequency of loop gap resonator 810 to match a predetermined resonant frequency, such as a resonant frequency of an atomic sample being probed in an atomic sensor. For example, loop gap resonator 810 can reside in an evacuated chamber of an atomic sensor or atomic clock.

EXAMPLE EMBODIMENTS

Example 1 includes a device comprising: a loop gap resonator having opposing sides and a central opening therethrough; and at least one exciter board positioned over, and at a preselected distance from, at least one of the opposing sides of the loop gap resonator, the at least one exciter board including at least one metallized layer and a central hole therethrough; wherein the at least one exciter board has one or more cutouts with respect to the central hole that define a geometric configuration, such that a first portion of the at least one metallized layer borders with the central hole at a first distance from a center point of the central hole, and a second portion of the at least one metallized layer borders the one or more cutouts at a second distance from the center point that is greater than the first distance; wherein the at least one exciter board is configured to shift a resonant frequency of the loop gap resonator to match a predetermined resonant frequency.

Example 2 includes the device of Example 1, wherein the one or more cutouts are substantially arc-shaped with respect to the central hole of the at least one exciter board.

Example 3 includes the device of Example 2, wherein the central hole substantially aligns with the central opening in the loop gap resonator.

Example 4 includes the device of any of Examples 1-3, wherein the loop gap resonator includes: an outer sidewall and an inner sidewall that extend between the opposing sides; and a set of feed holes that extend between the opposing sides, the feed holes in communication with the central opening through the inner sidewall.

Example 5 includes the device of Example 4, wherein the at least one exciter board has multiple cutouts with respect to the central hole that define the geometric configuration, such that a set of first portions of the exciter board border with the central hole at the first distance from the center point, and a set of second portions of the exciter board border with the cutouts at the second distance from the center point that is greater than the first distance.

Example 6 includes the device of Example 5, wherein: the first portions each include respective feed loops, which are connected to transmission lines within the at least one exciter board; and the feed loops are each substantially aligned with a respective one of the feed holes in the loop gap resonator.

Example 7 includes the device of any of Examples 1-6, wherein the at least one exciter board comprises a multilayer circuit board that includes one or more metallized layers and one or more substrate material layers.

Example 8 includes the device of Example 7, wherein the one or more metallized layers comprise copper.

Example 9 includes the device of any of Examples 1-8, wherein the loop gap resonator has a substantially cylindrical shape.

Example 10 includes the device of any of Examples 1-9, wherein the loop gap resonator resides in an evacuated chamber of an atomic sensor.

Example 11 includes the device of Example 10, wherein the predetermined resonant frequency comprises a resonant frequency of an atomic sample being probed in the atomic sensor.

Example 12 includes the device of any of Examples 1-11, wherein a first exciter board is positioned over one of the opposing sides of the loop gap resonator, and a second exciter board is positioned over the other of the opposing sides of the loop gap resonator, such that the central holes of each exciter board are substantially aligned with the central opening of the loop gap resonator.

Example 13 includes a device comprising: a loop gap resonator having a first side and an opposing second side, wherein an outer sidewall and an inner sidewall of the loop gap resonator extend between the first and second sides, the inner sidewall defining a central opening of the loop gap resonator, wherein a set of feed holes extend between the first and second sides; and a first exciter board positioned adjacent to, and at a preselected distance from, the first side of the loop gap resonator, the first exciter board including at least one metallized layer and a first central hole therethrough that substantially aligns with the central opening of the loop gap resonator; wherein the first exciter board has multiple cutouts with respect to the central hole that define a geometric configuration, such that a set of first portions of the first exciter board border with the first central hole at a first distance from a center point of the first central hole, and a set of second portions of the first exciter board border with the cutouts at a second distance from the center point that is greater than the first distance; wherein the first exciter board is configured to shift a resonant frequency of the loop gap resonator to match a predetermined resonant frequency.

Example 14 includes the device of Example 13, further comprising: a second exciter board positioned adjacent to, and at a preselected distance from, the second side of the loop gap resonator, the second exciter board including at least one metallized layer and a second central hole therethrough that substantially aligns with the central opening of the loop gap resonator.

Example 15 includes the device of Example 14, wherein the second exciter board has multiple cutouts with respect to the second central hole that define a geometric configuration, such that a set of first portions of the second exciter board border with the second central hole at a first distance from a center point of the second central hole, and a set of second portions of the second exciter board border with the cutouts at a second distance from the center point of the second central hole that is greater than the first distance from the center point of the second central hole.

Example 16 includes the device of Example 15, wherein the multiple cutouts of the first and second exciter boards are substantially arc-shaped with respect to the first and second central holes.

Example 17 includes the device of any of Examples 14-16, wherein the first and second exciter boards comprise multilayer circuit boards that each include one or more metallized layers and one or more substrate material layers.

Example 18 includes the device of any of Examples 13-17, wherein: the first portions each include respective feed loops, which are coupled to transmission lines within the first exciter board; and the feed loops are each substantially aligned with a respective one of the feed holes in the loop gap resonator.

Example 19 includes the device of any of Examples 13-18, wherein the loop gap resonator resides in an evacuated chamber of an atomic sensor.

Example 20 includes the device of Example 19, wherein the predetermined resonant frequency comprises a resonant frequency of an atomic sample being probed in the atomic sensor.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A device comprising:

a loop gap resonator having opposing sides and a central opening therethrough; and at least one exciter board positioned over, and at a preselected distance from, at least one of the opposing sides of the loop gap resonator, the at least one exciter board including at least one metallized layer and a central hole therethrough;

wherein the at least one exciter board has one or more cutouts with respect to the central hole that define a geometric configuration, such that a first portion of the at least one metallized layer borders with the central hole at a first distance from a center point of the central hole, and a second portion of the at least one metallized layer borders the one or more cutouts at a second distance from the center point that is greater than the first distance;

wherein the at least one exciter board is configured to shift a resonant frequency of the loop gap resonator to match a predetermined resonant frequency.

2. The device of claim 1, wherein the loop gap resonator includes:

an outer sidewall and an inner sidewall that extend between the opposing sides; and a set of feed holes that extend between the opposing sides, the feed holes in communication with the central opening through the inner sidewall.

3. The device of claim 2, wherein the at least one exciter board has multiple cutouts with respect to the central hole that define the geometric configuration, such that a set of first portions of the exciter board border with the central hole at the first distance from the center point, and a set of second portions of the exciter board border with the cutouts at the second distance from the center point that is greater than the first distance.

4. The device of claim 3, wherein:

the first portions each include respective feed loops, which are connected to transmission lines within the at least one exciter board; and the feed loops are each substantially aligned with a respective one of the feed holes in the loop gap resonator.

5. The device of claim 1, wherein the one or more cutouts are substantially arc-shaped with respect to the central hole of the at least one exciter board.

6. The device of claim 5, wherein the central hole substantially aligns with the central opening in the loop gap resonator.

7. The device of claim 1, wherein the at least one exciter board comprises a multilayer circuit board that includes one or more metallized layers and one or more substrate material layers.

8. The device of claim 7, wherein the one or more metallized layers comprise copper.

9. The device of claim 1, wherein the loop gap resonator resides in an evacuated chamber of an atomic sensor.

10. The device of claim 9, wherein the predetermined resonant frequency comprises a resonant frequency of an atomic sample being probed in the atomic sensor.

11. The device of claim 1, wherein the loop gap resonator has a substantially cylindrical shape.

12. The device of claim 1, wherein a first exciter board is positioned over one of the opposing sides of the loop gap resonator, and a second exciter board is positioned over the other of the opposing sides of the loop gap resonator, such that the central holes of each exciter board are substantially aligned with the central opening of the loop gap resonator.

13. A device comprising:

a loop gap resonator having a first side and an opposing second side, wherein an outer sidewall and an inner sidewall of the loop gap resonator extend between the first and second sides, the inner sidewall defining a central opening of the loop gap resonator, wherein a set of feed holes extend between the first and second sides; and a first exciter board positioned adjacent to, and at a preselected distance from, the first side of the loop gap resonator, the first exciter board including at least one metallized layer and a first central hole therethrough that substantially aligns with the central opening of the loop gap resonator;

wherein the first exciter board has multiple cutouts with respect to the central hole that define a geometric configuration, such that a set of first portions of the first exciter board border with the first central hole at a first distance from a center point of the first central hole, and a set of second portions of the first exciter board border with the cutouts at a second distance from the center point that is greater than the first distance;

wherein the first exciter board is configured to shift a resonant frequency of the loop gap resonator to match a predetermined resonant frequency.

14. The device of claim 13, further comprising:

a second exciter board positioned adjacent to, and at a preselected distance from, the second side of the loop gap resonator, the second exciter board including at least one metallized layer and a second central hole therethrough that substantially aligns with the central opening of the loop gap resonator.

15. The device of claim 14, wherein the second exciter board has multiple cutouts with respect to the second central hole that define a geometric configuration, such that a set of first portions of the second exciter board border with the second central hole at a first distance from a center point of the second central hole, and a set of second portions of the second exciter board border with the cutouts at a second distance from the center point of the second central hole that is greater than the first distance from the center point of the second central hole.

16. The device of claim 15, wherein the multiple cutouts of the first and second exciter boards are substantially arc-shaped with respect to the first and second central holes.

17. The device of claim 14, wherein the first and second exciter boards comprise multilayer circuit boards that each include one or more metallized layers and one or more substrate material layers.

18. The device of claim 13, wherein the loop gap resonator resides in an evacuated chamber of an atomic sensor.

19. The device of claim 18, wherein the predetermined resonant frequency comprises a resonant frequency of an atomic sample being probed in the atomic sensor.

20. The device of claim 13, wherein:

the first portions each include respective feed loops, which are coupled to transmission lines within the first exciter board; and the feed loops are each substantially aligned with a respective one of the feed holes in the loop gap resonator.

* * * * *